United States Patent [19]
Brolund et al.

[11] Patent Number: 5,468,929
[45] Date of Patent: Nov. 21, 1995

[54] APPARATUS FOR ADJUSTING THE STAND-OFF HEIGHT OF A PLASMA ARC TORCH OR THE LIKE

[75] Inventors: Theodore F. Brolund, Rockford; Eugene H. Paquet, Byron, both of Ill.

[73] Assignee: W. A. Whitney Co., Rockford, Ill.

[21] Appl. No.: 361,639

[22] Filed: Dec. 22, 1994

[51] Int. Cl.[6] ................................................. B23K 10/00
[52] U.S. Cl. ........................ 219/121.56; 219/124.1; 219/121.37; 219/121.58
[58] Field of Search ................ 219/124.02, 124.1, 219/124.31, 121.54, 121.58, 121.56, 124.34, 130.4, 121.37

[56] References Cited

U.S. PATENT DOCUMENTS

| | | | |
|---|---|---|---|
| 3,732,527 | 5/1973 | McKnight | 339/103 M |
| 4,063,059 | 12/1977 | Brolund et al. | 219/121.56 |
| 4,415,795 | 11/1983 | Ross et al. | 219/124.02 |
| 5,160,821 | 11/1992 | Oakley | 219/121.56 |
| 5,371,336 | 12/1994 | Albert et al. | 219/121.54 |

*Primary Examiner*—Mark H. Paschall
*Attorney, Agent, or Firm*—Leydig, Voit & Mayer, Ltd.

[57] ABSTRACT

The stand-off height of a plasma arc torch relative to an underlying workpiece is adjusted by rotating a collar on an adaptor to which the torch is affixed. When the collar is rotated, a camming action occurs to effect upward or downward movement of the torch within a vertically fixed housing and thereby adjust the vertical distance between the torch and the workpiece.

10 Claims, 3 Drawing Sheets

APPARATUS FOR ADJUSTING THE STAND-OFF HEIGHT OF A PLASMA ARC TORCH OR THE LIKE

BACKGROUND OF THE INVENTION

This invention relates to a metal melting tool such as a plasma arc torch or a laser for performing cutting operations on an underlying metal workpiece. An exemplary plasma arc torch is disclosed in Sturges et al U.S. Pat. No. 5,079,403 while a typical laser cutting tool is disclosed in Scott et al U.S. Pat. No. 4,550,241.

In tools of the above type, it is important to maintain a constant but adjustable vertical spacing or standoff height between the working tip of the tool and the underlying workpiece. When the tool is, for example, a plasma arc torch, it is necessary to adjust the stand-off height depending on factors such as the rated amperage of the torch and/or the thickness of the particular workpiece.

Prior mechanical systems for adjusting the stand-off height of a metal melting tool require several components, require time-consuming adjustments to be made and, in some cases, require the use of a gage between the tool tip and the workpiece to establish the desired stand-off height. Electronically controlled stand-off height adjusting systems enable much quicker and easier adjustment but such systems are complex, have a high initial cost and are expensive to repair.

SUMMARY OF THE INVENTION

The general aim of the present invention is to provide new and improved mechanical apparatus for adjusting the stand-off height of a metal melting tool, the apparatus being characterized by its relatively simple and low cost construction and by its ability to enable the adjustment to be made quickly, easily and precisely.

A more detailed object of the invention is to achieve the foregoing by providing apparatus which enables adjustment of the stand-off height simply by releasing a simple locking device, rotating an adjustment member, and then re-locking the locking device.

These and other objects and advantages of the invention will become more apparent from the following detailed description when taken in conjunction with the accompanying drawings.

Figure 1:
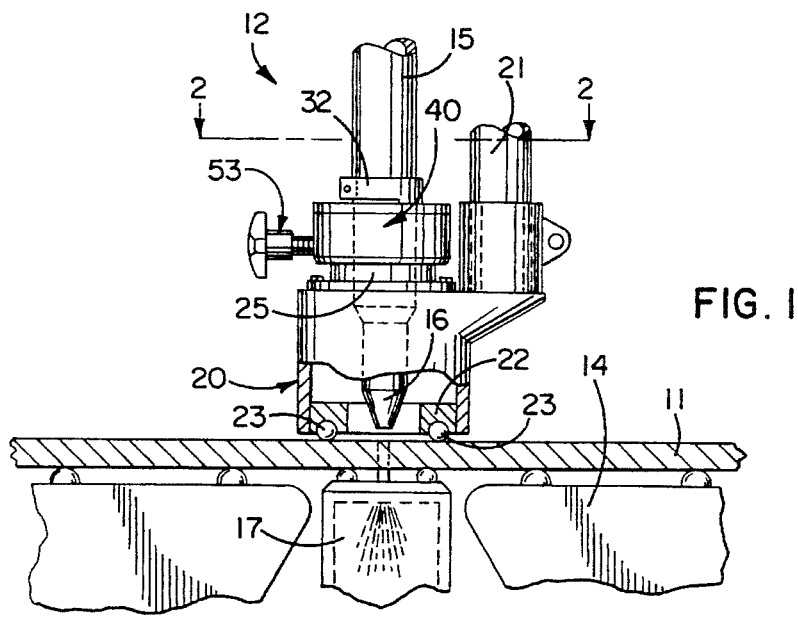
FIG. 1 is a fragmentary front elevational view of a typical metal melting tool equipped with new and improved stand-off height adjustment apparatus incorporating the unique features of the present invention, certain components being broken away and shown in section.

While the invention is susceptible of various modifications and alternative constructions, a certain illustrated embodiment hereof has been shown in the drawings and will be described below in detail. It should be understood, however, that there is no intention to limit the invention to the specific form disclosed, but on the contrary, the intention is to cover all modifications, alternative constructions and equivalents falling within the spirit and scope of the invention.

DETAILED DESCRIPTION OF THE PREFERRED EMBODIMENT

The present invention is shown in the drawings in connection with apparatus for cutting holes and irregular shaped slots in a sheet metal workpiece 11 through the use of a metal melting tool 12 operable to emit downwardly directed energy for melting the workpiece. The workpiece is disposed in a horizontal plane and is supported on a table 14 which, in turn, is supported on an underlying bed or bolster (not shown). The table is adapted to be moved along one coordinate or axis in order to shift the workpiece horizontally beneath the tool and position the workpiece for cutting of the holes and slots. In addition, the workpiece is adapted to be shifted on the table and along a perpendicular coordinate or axis by movable work clamps (not shown).

In the present instance, the metal melting tool 12 is a plasma-arc torch, although the tool could be a laser cutter. The plasma-arc torch 12 includes an elongated tubular member 15 whose lower end carries a tip 16 defining a small nozzle through which a hot plasma stream is discharged. The plasma stream is discharged from the nozzle at a high velocity and produces extremely high temperatures to cause instantaneous melting of the underlying portion of the workpiece 11 and to blast molten metal downwardly from the workpiece 11 and into a duct 17 which underlies the workpiece.

A main support or housing 20 surrounds the nozzle 16 and is connected to a vertical rod 21. Fixed in the lower end portion of the housing 20 is a stand-off ring 2 whose lower side carries a plurality of angularly spaced balls 23. During cutting of the workpiece 11 by the torch 12, the housing 20 is held in a vertically fixed position with the balls 23 in engagement with the upper side of the workpiece. By retracting the rod 21, the housing and the torch may be raised to an inactive position spaced a substantial distance from the workpiece.

As will become apparent subsequently, the tubular member 15 of the torch 12 is fixed to the housing 20 and thus the stand-off ring 22 holds the nozzle 16 a predetermined distance above the workpiece 11, such distance commonly being referred to as the stand-off height. Various factors such as torch amperage, workpiece thickness, etc. require that the stand-off height be adjusted for different operating conditions.

Figure 2:
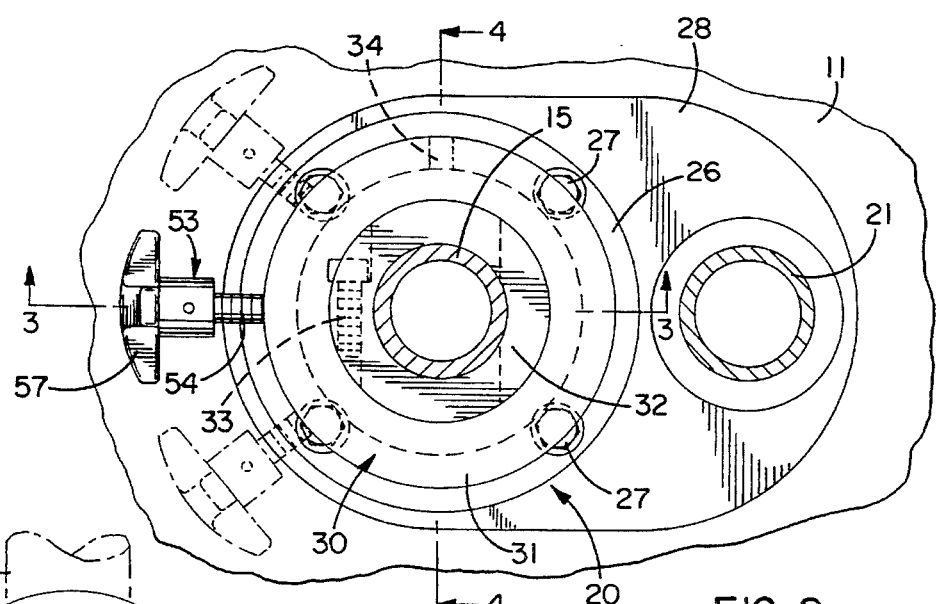
FIG. 2 is an enlarged fragmentary cross-section taken substantially along the line 2—2 of FIG. 1.
Figure 5:
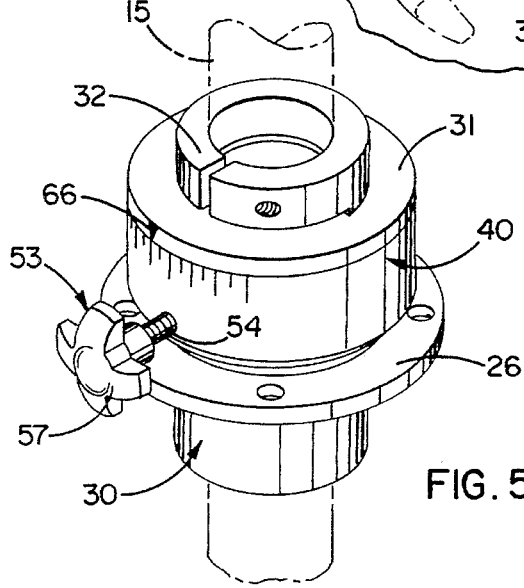
FIG. 5 is a perspective view of the stand-off height adjustment apparatus.
Figure 3:
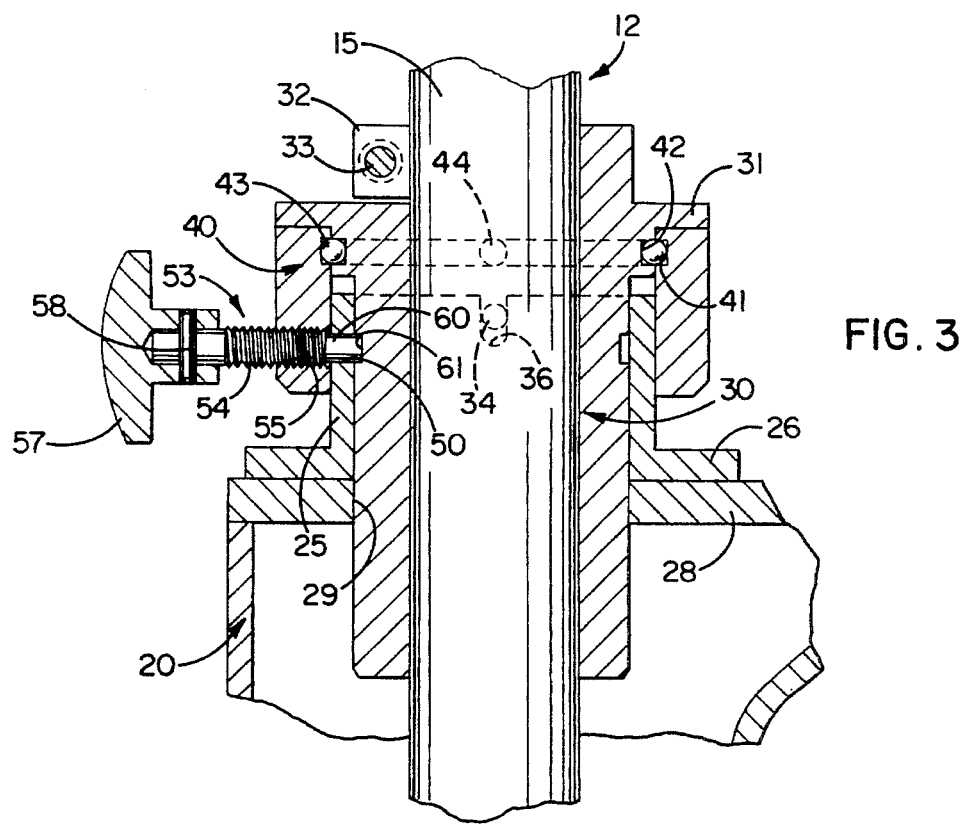
FIGS. 3 and 4 are enlarged fragmentary cross-sections taken substantially along the lines 3—3 and 4—4, respectively, of FIG. 2.

The present invention contemplates the provision of extremely simple and relatively inexpensive mechanical apparatus for enabling quick, easy and precise adjustment of the stand-off height of the torch 12. Herein, such apparatus comprises a sleeve 25 (FIGS. 6–9) whose lower end is formed with a radially extending flange 26 which is rigidly bolted at 27 (FIG. 2) to the top wall 28 of the housing 20, the sleeve being coaxial with an opening 29 (FIG. 3) formed through the top wall. Being rigid with the housing 20, the sleeve 25 forms part of the main support for the torch 12.

Telescoped slidably into the sleeve 25 is a tubular adaptor 30 whose lower end portion projects downwardly through the opening 29. Near its upper end portion, the adaptor is formed with a radially outwardly extending flange 31 and, above the flange, is formed with a split clamping ring 32. The tubular member 15 of the torch 12 is received in the adaptor 30 and, when a locking screw 33 (FIG. 6) is tightened, the ring 32 clamps around the tubular member to hold the torch in a fixed position in the adaptor.

Figure 4:
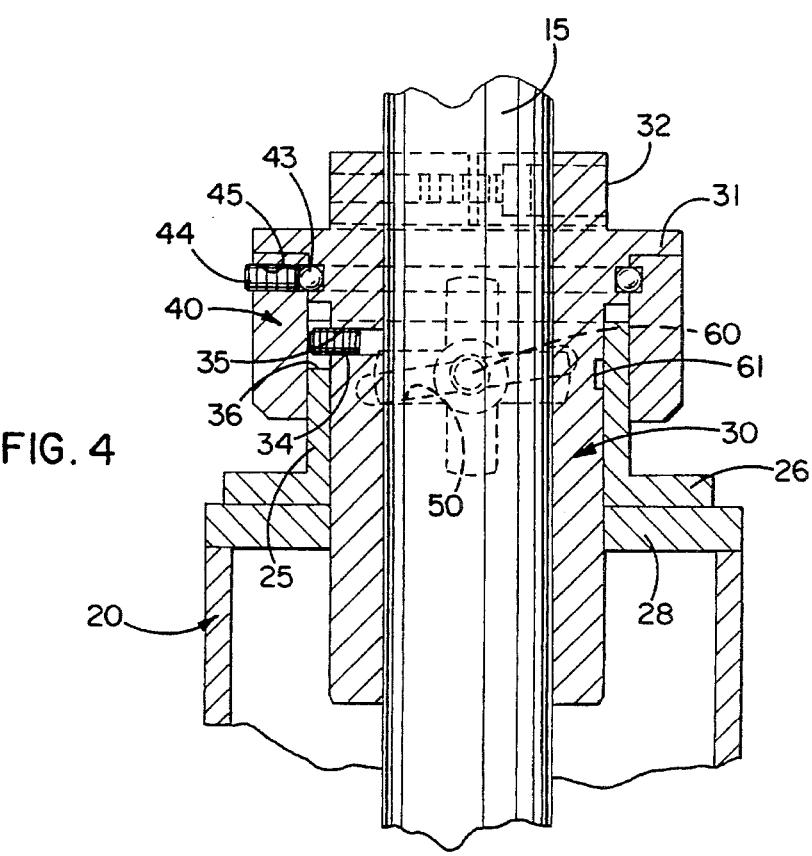
Figure 6:
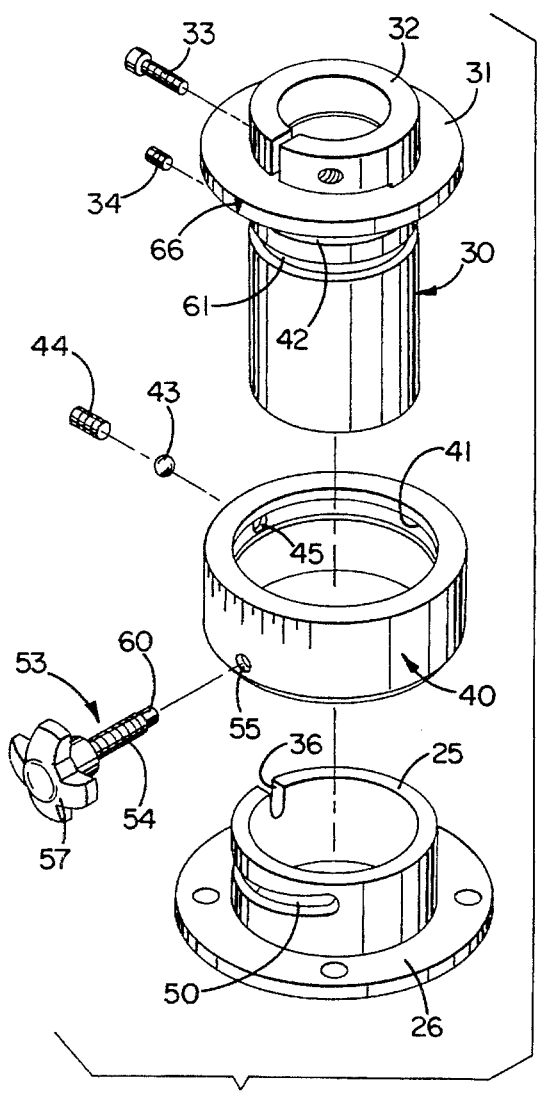
FIG. 6 is an exploded perspective view of the apparatus shown in FIG. 5.
Figure 7:
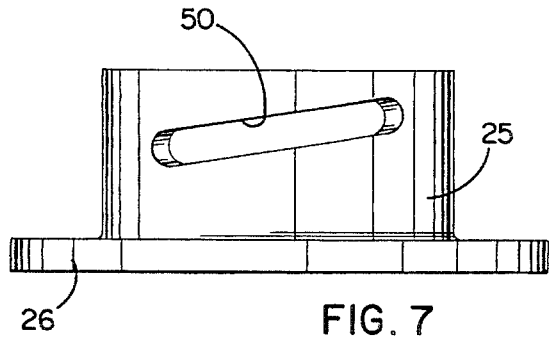
FIGS. 7 and 8 are side and front elevational views, respectively, of one component of the adjusting apparatus.
Figure 8:
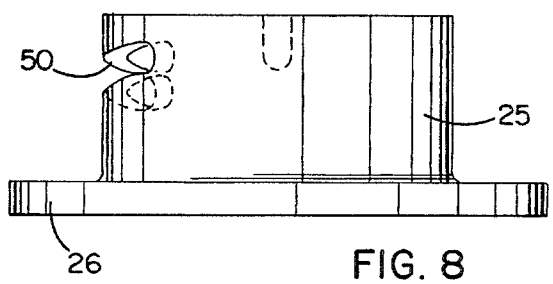

A set screw 34 (FIG. 4) is threaded into a radially extending hole 35 in the adaptor 30 and is slidably received in an upwardly opening and generally U-shaped notch 36 formed in the upper end of the sleeve 25. The screw 34 prevents the adaptor from rotating relative to the sleeve while permitting the adaptor to slide vertically in the sleeve.

A generally cylindrical collar 40 is telescoped slidably and rotatably over the upper end portion of the sleeve 25 and is positioned with its upper end in engagement with the lower side of the flange 31 of the adaptor 30. Opposing grooves 41 and 42 (FIGS. 3 and 6) are formed in the inner side of the collar and the outer side of the adaptor just below the flange 31 and are filled with a train of balls 43. The balls captivate the collar against axial movement relative to the adaptor while supporting the collar for relatively friction-free rotation on the adaptor. A threaded plug 44 (FIGS. 4 and 6) may be removed from a tapped and radially extending hole 45 in the collar to enable the balls to be installed in the grooves, the plug closing the hole and retaining the balls in the grooves after the latter have been filled.

In carrying out the invention, the stand-off height of the torch is adjusted by rotating the collar 40 relative to the sleeve 25. For this purpose, the sleeve includes a cam surface which herein is defined by the upper edge of a slot 50 formed through the sleeve. The slot is helical in shape and thus progresses vertically along the sleeve upon proceeding angularly around the sleeve.

Coacting with the slot 50 in the sleeve 25 is a locking device 53 which, in the present instance, includes a screw 54 that is threaded into a tapped and radially extending hole 55 (FIG. 3) formed through the lower end portion of the collar. A knob 57 is attached to the outer end of the screw by a pin 58 to facilitate tightening and loosening of the screw. The inner or tip end portion of the screw is formed with a cylindrical and unthreaded dogpoint 60 which extends with a close fit through the slot 50 in the sleeve 25 and which normally seats with a close fit in an annular groove 61 formed around the outer side of the adaptor 30.

When the screw 54 is fully tightened, the dogpoint 60 is clamped tightly against the bottom of the groove 61 and thus prevents the collar 40 from rotating relative to the sleeve 25 and the adaptor 30. In addition, the dogpoint engages the edges of the slot 50 in the sleeve 25 to prevent the adaptor from shifting vertically relative to the sleeve. Accordingly, the adaptor and the tubular member 15 of the torch 12 are held in a fixed vertical position relative to the housing 20 so as to establish the stand-off height of the nozzle 16.

To change the stand-off height, the screw 54 is loosened sufficiently to unclamp the dogpoint 60 from the groove 61 in the adaptor 30 but to leave the dogpoint in the slot 50 in the sleeve 25. The collar 40 thus is free to rotate on the sleeve and the adaptor and, in addition, the adaptor is free to move upwardly and downwardly within the sleeve. Rotation of the collar is effected in one direction or the other by grasping the knob 57 and using the knob as a handle to rotate the adaptor. During such rotation, the dogpoint 60 is cammed against or is cammed by the edges of the slot 50 and effects raising or lowering of the adaptor in the sleeve, depending on the direction of rotation of the collar. In this way, the standoff height of the nozzle 16 is adjusted since the nozzle and the tubular member 15 of the torch 12 move upwardly and downwardly with the adaptor. Once the desired standoff height is established, the screw 54 is re-tightened to clamp the dogpoint 60 against the bottom of the groove 61 and thereby once again prevent rotation of the collar and prevent vertical movement of the adaptor within the sleeve 25.

Figure 9:
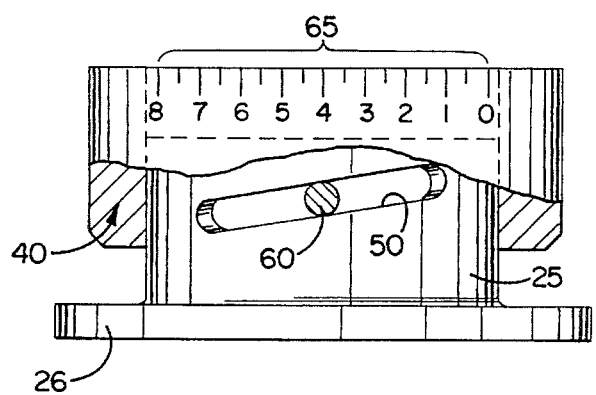
FIG. 9 is a view similar to FIG. 7 but shows the rotatable adjusting member assembled to the component of FIG. 7.

As shown in FIG. 9, the outer side of the collar 40 may be provided with a calibrated scale 65 which coacts with an arrow 66 (FIG. 6) or other mark on the outer side of the flange 31 of the adaptor 30. The calibrations may be in terms (e.g., millimeters) of the stand-off height and serve as a guide to the torch operator when adjusting the stand-off height.

From the foregoing, it will be apparent that the present invention brings to the art new and improved apparatus in which the stand-off height of the torch 12 may be adjusted simply by loosening the screw 54, rotating the collar 40 and then re-tightening the screw. The apparatus is much more convenient and faster to use than prior mechanical arrangements, including those which use multiple shims to establish the stand-off height.

We claim:

1. Apparatus for establishing the standoff height of a metal melting tool with respect to an underlying metal workpiece, said apparatus comprising a main support for attachment to a metal melting tool and adapted to be held in a vertically fixed position during melting of a workpiece by the tool, an adaptor fixedly connected to said tool and telescoped into said support for up and down sliding relative thereto, a collar rotatably supported on said adaptor, adjusting means for providing vertical movement of said adaptor relative to said support in response to rotation of said collar, Said rotation being motivated by an externally applied force, and locking means coacting between said support, said adaptor and said collar for preventing vertical movement of said adaptor relative to said support when said locking means is engaged, while permitting such vertical movement when said locking means is released and said collar is rotated on said adaptor.

2. Apparatus as defined in claim 1 in which said collar is fixed against vertical movement relative to said adaptor, said locking means including a selectively releasable locking device normally holding said adaptor against vertical movement relative to said support and normally holding said collar against rotation on said adaptor.

3. Apparatus for establishing the standoff height of a metal melting tool with respect to an underlying metal workpiece, said apparatus comprising a main support for attachment to a metal melting tool and adapted to be held in a vertically fixed position during melting of a workpiece by the tool, an adaptor fixedly connected to said tool and telescoped into said support for up and down sliding relative thereto, a collar rotatably supported on said adaptor and fixed against vertical movement relative to said adaptor, a selectively releasable locking device normally holding said adaptor against up and down sliding relative to said support and normally holding said collar against rotation on said adaptor, and means for causing said adaptor to slide upwardly or downwardly relative to said support, said means being responsive to rotation of said collar motivated by an external rotary force applied to said collar when said locking device is released, said means being disposed to cause said adaptor to slide upwardly in response to rotation of said collar in a first direction and to cause said adaptor to slide downwardly in response to rotation of said collar in a second direction.

4. Apparatus as defined in claim 3 in which said means include a cam surface on said support, said cam surface progressing vertically along said support upon proceeding angularly around said support.

5. Apparatus as defined in claim 4 in which a slot is formed through said support, said slot having an edge defining said cam surface.

6. Apparatus as defined in claim 5 in which said slot is helically curved.

7. Apparatus as defined in claim 5 in which said locking device comprises a screw threaded into said collar and having a tip end portion extending into said slot, said tip end portion coacting with said edge of said slot to cause said adaptor to slide relative to said support when said screw is loosened and said collar is rotated relative to said adaptor.

8. Apparatus as defined in claim 7 further including an annular groove formed around said adaptor, the tip end portion of said screw seating in said groove when said screw is tightened thereby to hold said adaptor against up and down sliding relative to said support.

9. Apparatus as defined in claim 3 in which said collar includes calibrations for indicating the angular position of said collar relative to said adaptor.

10. Apparatus as defined in claim 3 further including opposing annular grooves formed in said collar and said adaptor, and a train of balls filling said grooves to support said collar for rotation on said adaptor.

* * * * *